United States Patent [19]

Friebel

[11] 4,007,635
[45] Feb. 15, 1977

[54] FLUID VOLUME APPARATUS FOR MEASURING A FLUID UNDER PRESSURE

[75] Inventor: Eberhard Friebel, Berlin, Germany

[73] Assignee: Siemens Aktiengesellschaft, Munich, Germany

[22] Filed: June 23, 1975

[21] Appl. No.: 589,002

[30] Foreign Application Priority Data

June 28, 1974 Germany ............................ 2431751

[52] U.S. Cl. ......................................... 73/273; 73/253
[51] Int. Cl.² ...................... G01F 3/08; G01F 15/14
[58] Field of Search .... 73/152, 201, 232, 239–261, 73/431, 198, 273

[56] References Cited

UNITED STATES PATENTS

| | | | |
|---|---|---|---|
| 1,165,429 | 12/1915 | Mass | 73/201 X |
| 1,495,010 | 5/1924 | Ford | 73/258 |
| 1,918,606 | 7/1933 | Lake | 73/253 X |

Primary Examiner—Richard C. Queisser
Assistant Examiner—John P. Beauchamp
Attorney, Agent, or Firm—Kenyon & Kenyon Reilly Carr & Chapin

[57] ABSTRACT

The invention is directed to an improvement for a fluid-volume apparatus for measuring a fluid under pressure. A measuring chamber housing with a movable measuring part is arranged in a pressure-resistant outer housing. A fluid medium is present in the space between the outer housing and the measuring-chamber housing. The improvement includes separating this space between the measuring-chamber housing and the outer housing from the fluid to be measured in a fluid-tight manner and providing a pressure-responsive element for placing the above-mentioned space between housings in pressure-equalizing communication with the liquid to be measured whereby the pressure of the fluid medium in the space between the housings is at a pressure which corresponds to the pressure of the liquid to be measured.

7 Claims, 1 Drawing Figure

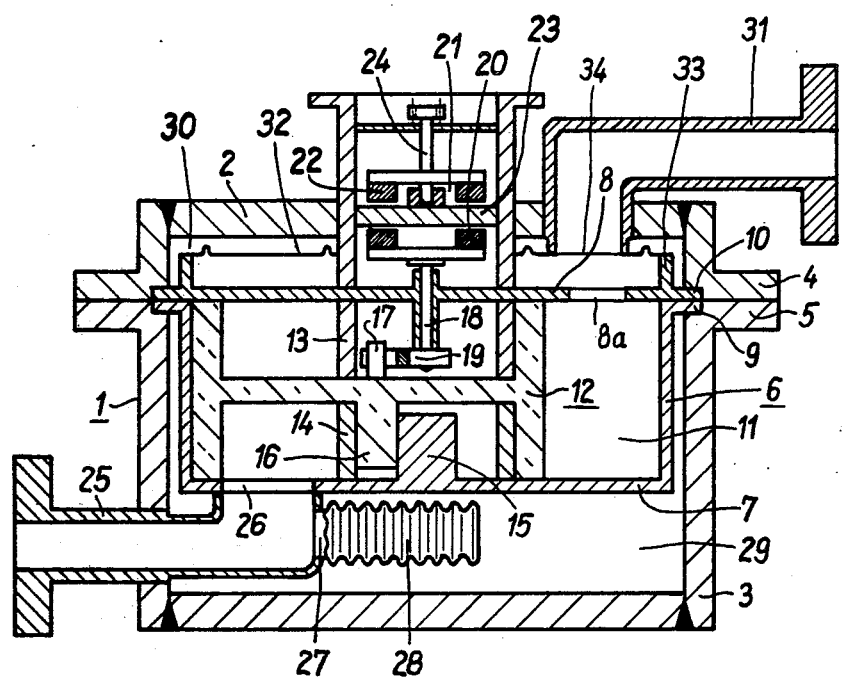

FLUID VOLUME APPARATUS FOR MEASURING A FLUID UNDER PRESSURE

BACKGROUND OF THE INVENTION

The invention concerns a fluid-flow meter for measuring a fluid under pressure. The flow meter includes a pressure-resistant outer housing in which a measuring-chamber housing with a movable measuring part is arranged, and a fluid medium in the space between the outer housing and the measuring-chamber housing which is at a pressure corresponding to the pressure of the fluid to be measured.

Fluid-flow meters for measuring fluids under pressure must be constructed so that their components which are important for measurement, particularly the measuring chamber machined to close tolerances, are not deformed, or only negligibly so, under the high pressure of the fluid, as otherwise, the functioning or at least the measuring accuracy would be adversely affected.

To meet these requirements in the commercially available flow meters described above, the space between the outer housing and the measuring-chamber housing is also filled with the liquid under pressure, which is to be measured. In this way, in these commercially available flow meters, the pressure outside and inside the measuring-chamber housing is practically equal. The measuring-chamber housing which, because of the required corrosion resistance, must frequently be made of high-quality material, can then be made with thin walls, which has a favorable effect on the manufacturing costs.

A flow meter constructed in this manner, however, has the important disadvantage that also the outer housing must be made of high-quality material because, if the fluids to be measured are corrosive, it must also be resistant to corrosion. Because the outer housing must be able to withstand the pressure of the fluid to be measured, it must be made correspondingly stable and this requires a relatively large amount of high-cost material. The manufacturing costs are therefore unfavorably high for this known flow meter. It is another important disadvantage of the known flow meter that it cannot be used very well in the food industry because it can hardly be cleaned, or only with great difficulty.

SUMMARY OF THE INVENTION

It is an object of the invention to provide a flow meter for fluids which can be manufactured inexpensively. It is another object of the invention to provide such a flow meter which can also be configured for measuring corrosive fluids under pressure and which can also be cleaned easily because of its configuration.

According to the invention, to achieve these objects, enclosure means in the form of a space between the measuring-chamber housing and the outer housing is separated, in a fluid-flow meter of the type described above from the liquid to be measured in a liquid-tight manner and is in pressure-equalizing communication with the liquid to be measured by means of at least one element which is movable under pressure.

The advantage of the fluid-flow meter according to the invention is primarily that, because the space between the outer housing and the measuring-chamber housing is closed off from the fluid to be measured in a liquid-tight manner and because it is therefore possible and preferable to fill this space with a non-corrosive liquid, the outer housing can be made of relatively low-quality material becuase it needs to have only adequate pressure resistance. Because of the elements which are movable under pressure, the advantage of the known fluid-flow meter of being able to make the measuring-chamber housing with thin walls is preserved because the pressure of the fluid to be measured can be transmitted via the pressure-movable element to the space between the outer housing and the measuring-chamber housing. A further advantage of the fluid-flow meter according to the invention is seen in the fact that the space between the outer housing and the measuring-chamber housing needs no cleaning because it is separated from the fluid to be measured; therefore, with the fluid-flow meter according to the invention, no problems arise other than have already been solved in the conventional flow meters used in the food industry.

As already mentioned above, any fluid that has no corroding properties can be used as the fluid medium for the space between the outer housing and the measuring-chamber housing. The use of oil is considered advantageous.

The pressure-movable element can be provided in principle within the outer housing at any point of the wall between the space through which the fluid to be measured flows and the space with the liquid medium. For reasons of space, for instance, it may be frequently advantageous, however, to dispose the pressure-movable element at the inlet- and/or outlet duct of the measuring-chamber housing.

The pressure-movable element may be configured in different ways; it is, for instance, advantageous to make the pressure-movable element in the form of bellows.

Particularly if in the attempt, which is considered advantageous, to keep the space between the outer housing and the measuring-chamber housing small, only a relatively small space for mounting the pressure-movable element is available, it is considered advantageous to configure the pressure-movable element as a diaphragm.

Although the invention is illustrated and described herein as a fluid volume apparatus for measuring a fluid under pressure, it is nevertheless not intended to be limited to the details shown, since various modifications may be made therein within the scope and the range of the claims. The invention, however, together with additional objects and advantages will be best understood from the following description and in connection with the accompanying drawing.

BRIEF DESCRIPTION OF THE DRAWING

The drawing is a schematic diagram, in section, of a fluid volume measuring apparatus equipped with the improvement according to the invention. Pressure-responsive means in the form of a bellows and a membrane are illustrated in the drawing.

DESCRIPTION OF THE PREFERRED EMBODIMENTS OF THE INVENTION

The liquid-flow meter has an outer housing 1 which consists of an upper part 2 and a lower part 3; both parts are provided with flanges 4 and 5, respectively, and bolted together in the region of these flanges 4 and 5.

Inside the outer housing 1, a measuring-chamber housing 6 is arranged, which consists of a cup-shaped part 7 and a cover part 8. The cup-shaped part 7 as well as the cover part 8 are provided with respective flanges 9 and 10 which are clamped together when the upper and lower parts 2 and 3 of the outer housing 1 are bolted together and thus form a measuring chamber 11. Inside the measuring chamber 11, a ring piston 12 is movably supported and is guided by means of internal rings 13 and 14 as well as a chamber post 15 and by the guide post 16 of the ring piston 12.

The ring piston 12 has a drive pin 17 which engages a dog 19 fastened on an output shaft 18. On the output shaft 18 is mounted one-half 20 of a magnetic clutch 21, whose other half 22 is separated by a liquid-tight, nonmagnetic partition 23 from the clutch half 20. By means of a further output shaft 24 of the liquid-flow meter, a counting mechanism, not shown, is driven.

At the lower part 3 of the outer housing 1, an inlet stub 25 is disposed which extends into the interior of the outer housing 1 up to an inlet opening 26 in the measuring-chamber housing 6. In the vicinity of the inlet opening 26, an opening 27 is provided in the inlet stub 25. The opening 27 is closed off by pressure-responsive means in the form of a pressure-movable element 28 configured in the form of bellows. The pressure-movable element 28 thus separates the liquid under pressure to be measured, which flows in through the inlet duct 25, from the space 29 between the lower part of the outer housing 1 and the cup-shaped part 7 of the measuring-chamber housing 6; in the space 29 there is a non-corrosive liquid, preferably oil. Through the pressure-movable element 28, the pressure of the liquid to be measured is transmitted to the space 29, so that approximately the same pressure is established inside and outside the measuring chamber 11. The measuring-chamber housing 6 is therefore not stressed in pressure and can therefore be made with thin walls.

In a similar manner the space 30 between the upper part 2 of the outer housing 1 and the cover part 8 of the measuring-chamber 6 can be closed off against the outlet stub 31 by a pressure-movable element in the form of a bellows. However, to illustrate a further possible configuration of the pressure-movable element, the space 30 is separated from the liquid to be measured by means of a pressure-movable element configured as a diaphragm 32. For this purpose the diaphragm 32 is placed on a ring-shaped extension 33 of the cover part 8 and is connected with the outlet duct 31 also at the rim of the opening 34 of the latter, providing a seal. In this way, it is assured that also the liquid medium present in the space 30, preferably oil, is separated from the liquid to be measured and is under the same pressure as the liquid to be measured. The liquid under pressure to be measured flows in through the inlet stub 25 and inlet opening 26 causing a rotation of ring piston. The liquid exits the measuring chamber 11 through an outlet opening 8a in the cover 8 and the opening 34 in the diaphragm 32 to the outlet duct 31.

What is claimed is:

1. In a fluid-volume apparatus for measuring fluid flow under pressure having a pressure-resistant housing, a measuring chamber housing arranged within the outer housing so as to conjointly define therewith a space, and a fluid medium contained within said space, inlet and outlet ducts being provided to supply said fluid under pressure to and remove it from said measuring chamber housing, said inlet and outlet ducts passing through said outer housing, the improvement comprising: pressure-responsive means interposed between the fluid to be measured and the fluid medium in said space thereby enclosing said space, said pressure-responsive means equalizing the pressures developed by the fluid to be measured and said fluid medium contained in said enclosed space.

2. The improvement according to claim 1, said fluid medium being a non-corrosive liquid.

3. Apparatus according to claim 1 wherein said pressure-responsive means is a bellows.

4. Apparatus according to claim 1 wherein said pressure-responsive means is a membrane.

5. Apparatus according to claim 1 wherein said pressure-responsive means includes an element movable in response to the pressure developed by the fluid to be measured and wherein said pressure-responsive element is in communication with the fluid to be measured at said inlet duct of the measuring chamber housing.

6. Apparatus according to claim 1 wherein said pressure-responsive means includes an element movable in response to the pressure developed by the fluid to be measured and wherein said pressure-responsive element is in communication with the fluid to be measured at said outlet duct of the measuring chamber housing.

7. Apparatus according to claim 1 wherein said enclosed space is divided into two spaces and wherein first and second pressure-responsive means are provided, one disposed so as to be in communication with the fluid being measured at said inlet duct and the other disposed so as to be in communication with the fluid being measured at said outlet duct.

* * * * *